United States Patent

Nudds

[11] 3,734,119
[45] May 22, 1973

[54] APPARATUS FOR DETERMINING VISCOSITY

[75] Inventor: Derrick Albert Nudds, Brentwood, England

[73] Assignee: N. V. Tools Limited, Brentwood, Essex, England

[22] Filed: Feb. 7, 1972

[21] Appl. No.: 224,031

[30] Foreign Application Priority Data

Feb. 8, 1971   Great Britain.......................4,181/71

[52] U.S. Cl..................137/92, 73/54, 259/DIG. 16, 259/DIG. 46
[51] Int. Cl............................................G05d 24/02
[58] Field of Search ...........................73/54; 137/92; 259/DIG. 16, DIG. 46; 184/6.22

[56] References Cited

UNITED STATES PATENTS

| | | | |
|---|---|---|---|
| 2,630,819 | 3/1953 | Norcross | 137/92 |
| 2,696,735 | 12/1954 | Woodward | 73/59 |
| 2,917,065 | 12/1959 | Monk | 137/92 |
| 2,973,639 | 3/1961 | Banks | 73/54 |
| 3,195,866 | 7/1965 | Coats | 137/92 X |
| 3,286,507 | 11/1966 | Moore | 73/54 X |
| 3,382,706 | 5/1968 | Fitzgerald et al. | 73/54 X |
| 3,474,663 | 10/1969 | Whitmer et al. | 73/54 |

*Primary Examiner*—Martin P. Schwadron
*Assistant Examiner*—David J. Zobkiw
*Attorney*—Irving M. Weiner

[57] ABSTRACT

Apparatus for determining the viscosity of a liquid which includes a pivoted paddle or like member arranged to be immersed in the liquid and driven by means of an electromagnetic force acting upon the member, means for reversing the direction of the electromagnetic force each time the member reaches a predetermined point in each direction of its travel and thereby causing the member to be driven back and forth in the liquid, and means for introducing a further liquid into the said liquid in such a way that in passing to the liquid said further liquid serves to lubricate the pivot of the member.

7 Claims, 3 Drawing Figures

APPARATUS FOR DETERMINING VISCOSITY

This invention relates to apparatus for determining the viscosity of a liquid and for controlling the viscosity to maintain it within predetermined limits.

Such apparatus finds particular application, for example, for controlling the viscosity of printing ink used in the graphic arts where, during a printing run, the viscosity of the ink gradually increases and thus, from time to time must be reduced to an acceptable value by the addition of a thinning agent.

The present invention consists in apparatus for determining the viscosity of a liquid, which includes a pivoted paddle or like member arranged to be immersed in the liquid and driven by means of an electromagnetic force acting upon the member, means for reversing the direction of the electromagnetic force each time the member reaches a predetermined point in each direction of its travel and thereby causing the member to be driven back and forth in the liquid, and means for introducing a further liquid into the said liquid in such a way that in passing to the liquid said further liquid serves to lubricate the pivot of the member.

In the accompanying drawings:

FIG. 3 shows a portion of the apparatus of FIG. 1 in a side view.

Figure 1:
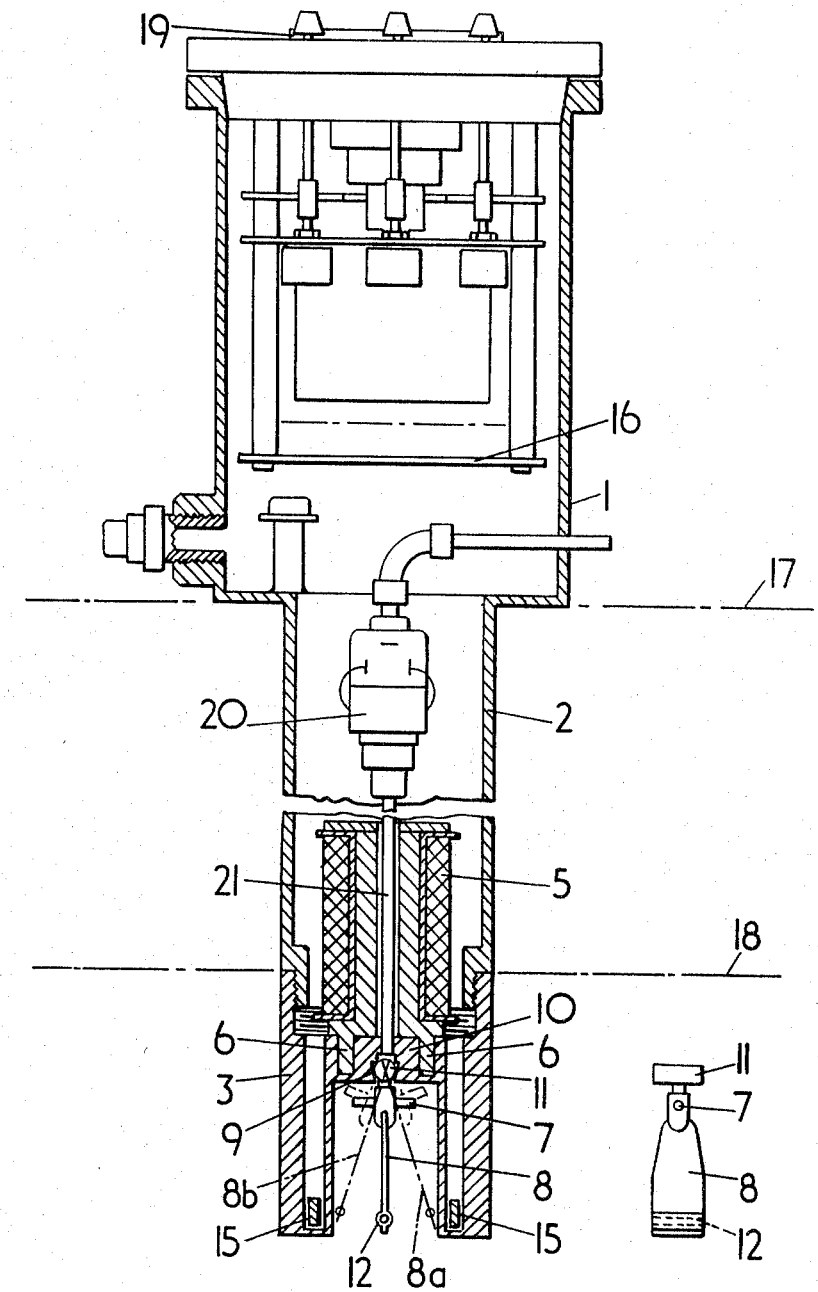
FIG. 1 is a longitudinal section through apparatus for determining viscosity according to the present invention.

In carrying the invention into effect according to one convenient mode by way of example, FIG. 1 shows apparatus which includes a housing 1 having a lower portion 2 of reduced diameter connected to end tubular portion 3.

Figure 2:
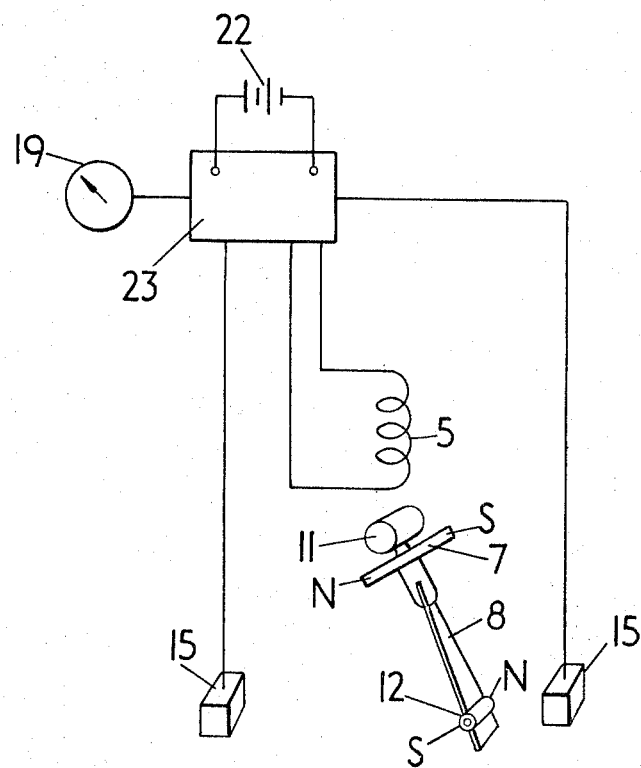
FIG. 2 shows schematically an electrical circuit used with the apparatus of FIG. 1.

End portion 3 contains a coil 5 having pole pieces 6 arranged so that when the coil 5 is energized with direct current from source 22 (FIG. 2) in one direction both pole pieces 6 become south poles thereby attracting the north pole of a magnet 7, fixed at right angles to the longitudinal axis of a paddle arm 8, to one side and swinging the paddle arm 8 to the position shown at 8a in FIG. 1. When the coil 5 is energized with direct current in the other direction, the paddle arm 8 is swung to the other side to the position shown at 8b in FIG. 1.

The upper end of the arm 8 is pivoted in a groove 9 of "dovetail" cross-section formed in block 10 by means of a roller 11 fitting in the groove and secured to the upper end of arm 8.

As shown in FIGS. 1 and 3, the lower end of the arm 8 carries a magnet 12 which is at right angles to magnet 7 and arranged to operate alternately transducer 15 located in the end portion 3, which transducers 15 may be in the form of pick-up coils or reed switches. The transducers 15 are located parallel to magnet 12, and thus at right angles to magnet 7, in order to eliminate any possibility of the transducers 15 being operated spuriously by the system consisting of magnet 7 and pole pieces 6.

Energization of the coil 5 is controlled by the transducers 15 which are connected to a control circuit 23 mounted on board 16 in such a way that when energization of the coil in one direction has caused the paddle arm 8 to travel to the position 8a shown in FIG. 1, the transducer is triggered to cause the control circuit to reverse the direction of energization of coil 5, and vice versa.

In this way, the paddle arm 8 is driven to and fro by electro-magnetic force, and not until the arm has reached the full excursion in one direction is it driven in the opposite direction.

The lower portion of the housing of the apparatus is immersed in the liquid whose viscosity is to be determined and it will be appreciated that the frequency at which the arm 8 swings is directly related to viscosity of the liquid. Conveniently, this is recorded by counting the number of changes of direction performed by the paddle arm 8 in a given time, this being read out on a digital counter or in analogue form by means of an indicator 19.

The liquid level should not be above level 17 nor below level 18. The whole unit can be constructed to comply with flameproof regulations, and to work under these conditions. The design also lends itself to a liquid-tight construction.

The apparatus is intended to be used for controlling the viscosity of printing ink used in the graphic arts. In use, the ink becomes more viscous so that the viscosity count becomes slower and slower until such time as a predetermined maximum viscosity is reached, whereupon a signal is sent from control circuit 23 to cause valve 20 to be opened to cause a liquid thinning agent to be fed along conduit 21 into the ink until such time as the viscosity has fallen to a desired value. The lower end of conduit 21 is arranged to open out into the groove 9 so that in addition to reducing the viscosity the thinning liquid also serves to clean and lubricate the pivot of arm 8.

The apparatus can also be used to read viscosity only by switching out the valve 20.

We claim:

1. Apparatus for determining the viscosity of a liquid, which includes a pivoted paddle or like member arranged to be immersed in the liquid and driven by means of an electromagnetic force acting upon the member, means for reversing the direction of the electromagnetic force each time the member reaches a predetermined point in each direction of its travel and thereby causing the member to be driven back and forth in the liquid, and means for introducing a further liquid into the said liquid in such a way that in passing to the liquid said further liquid serves to lubricate the pivot of the member.

2. Apparatus as claimed in claim 1, wherein the paddle or like member is arranged to be driven by means of a first magnet fixed to the paddle or like member at right angles to its longitudinal axis, which magnet co-operates with a coil, arranged to be energized with direct current, to provide the said electromagnetic force.

3. Apparatus as claimed in claim 2, wherein the said means for reversing the direction of the electromagnetic force includes transducers positioned adjacent the extreme positions of the paddle or like member and arranged to operate a control circuit to reverse the direction of current flow through the coil at each extreme position of the paddle or like member.

4. Apparatus as claimed in claim 3, wherein the transducers are arranged to be operated by means of a second magnet fixed to the paddle or like member at right angles to the longitudinal axis of the paddle or like member and also at right angles to the first magnet.

5. Apparatus as claimed in claim 1, wherein the paddle or like member is pivoted by means of a roller secured to the upper end of paddle or like member at right angles to the longitudinal axis thereof, which roller is mounted within a groove for pivotal movement about a horizontal axis.

6. Apparatus as claimed in claim 5, wherein the groove is of "dovetail" cross-section.

7. Apparatus as claimed in claim 5, wherein a conduit for said further liquid opens out into the said groove.

* * * * *